US012483333B2

United States Patent
Kanazawa et al.

(10) Patent No.: US 12,483,333 B2
(45) Date of Patent: Nov. 25, 2025

(54) OPTICAL TRANSMITTER (71) Applicant: Nippon Telegraph and Telephone Corporation, Tokyo (JP)

(72) Inventors: Shigeru Kanazawa, Musashino (JP); Yasuhiko Nakanishi, Musashino (JP); Takahiko Shindo, Musashino (JP); Meishin Chin, Musashino (JP)

(73) Assignee: NTT, INC., Tokyo (JP)

( * ) Notice: Subject to any disclaimer, the term of this patent is extended or adjusted under 35 U.S.C. 154(b) by 215 days.

(21) Appl. No.: 18/258,396

(22) PCT Filed: Jan. 7, 2021

(86) PCT No.: PCT/JP2021/000324
§ 371 (c)(1),
(2) Date: Jun. 20, 2023

(87) PCT Pub. No.: WO2022/149235
PCT Pub. Date: Jul. 14, 2022

(65) Prior Publication Data
US 2024/0322910 A1 Sep. 26, 2024

(51) Int. Cl.
*H04B 10/50* (2013.01)
*G02B 6/293* (2006.01)
*G02B 6/42* (2006.01)

(52) U.S. Cl.
CPC ......... *H04B 10/506* (2013.01); *G02B 6/4215* (2013.01); *G02B 6/4286* (2013.01); *G02B 6/29367* (2013.01); *G02B 6/2938* (2013.01)

(58) Field of Classification Search
CPC .... H04B 10/564; H04B 10/506; H04B 10/50; H04B 10/40; H04J 14/0221; H04J 14/02;
(Continued)

(56) References Cited

U.S. PATENT DOCUMENTS 6,535,542 B1 3/2003 Cao
2001/0026563 A1 10/2001 Yagi
(Continued)

FOREIGN PATENT DOCUMENTS

JP 2001-284717 A 10/2001
JP 2002-185074 A 6/2002
(Continued)

OTHER PUBLICATIONS

K. Tsuzuki et.al., *Full C-Band Tunable DFB Laser Array Copackaged with InP Mach-Zehnder Modulator for DWDM Optical Communication Systems*, Journal of Selected Topics in Quantum Electronics, vol. 15, No. 3, 2009, pp. 521-527.
(Continued)

*Primary Examiner* — Hibret A Woldekidan
(74) *Attorney, Agent, or Firm* — Workman Nydegger (57) ABSTRACT

An optical transmitter that multiplexes wavelength channels includes: a first light source; one or more second light source each having a different wavelength; collimator lenses coupled to respective outputs of the first and second light sources; an optical multiplexer that causes an output light beam from the first light source to be transmitted from a first end surface to a second end surface, causes the output light beam from the first light source to be reflected by a reflecting mirror, causes an output light beam from the second light source to pass through a wavelength filter, causes the output light beam from the second light source to be reflected by the reflecting mirror, and causes output light beams of the respective wavelength channels, to sequentially multiplex the output light beams of the respective wavelength channels; and beam splitters respectively inserted between the collimator lenses and the first end surface.

3 Claims, 7 Drawing Sheets

(58) Field of Classification Search
CPC ... H04J 14/0307; H01S 5/0683; G02B 26/001
See application file for complete search history.

(56) References Cited

U.S. PATENT DOCUMENTS

| | | |
|---|---|---|
| 2002/0071458 A1 | 6/2002 | Iwafuji |
| 2003/0107746 A1 | 6/2003 | Hedin et al. |
| 2007/0171530 A1* | 7/2007 | Nakamura ........... G02B 26/001 |
| | | 359/580 |
| 2017/0026116 A1 | 1/2017 | Sprem et al. |
| 2017/0153458 A1* | 6/2017 | Mitamura ............. H01S 5/0683 |

FOREIGN PATENT DOCUMENTS

| | | | |
|---|---|---|---|
| JP | 2017-098505 A | | 6/2017 |
| JP | 2019050242 A | * | 3/2019 |

OTHER PUBLICATIONS

L.B. Aronson et. al., *Transmitter Optical Subassembly for XFP Applications*, ECTC2005, DOI:10.1109ECTC.2005.1441402, 2005, pp. 1058-1062.

* cited by examiner

OPTICAL TRANSMITTER

TECHNICAL FIELD

The present invention relates to an optical transmitter, and more particularly, to a multi-wavelength channel optical transmitter that uses a wavelength multiplexing optical transmission method.

BACKGROUND ART

With an increase in communication traffic, a wavelength multiplexing optical transmission method is conventionally used to increase the transmission capacity in an optical communication system. To perform wavelength multiplexing optical transmission, light sources are prepared for the respective wavelength channels, and output light beams from a plurality of light sources are multiplexed by an optical multiplexer and are output to an optical fiber. In an optical communication system, it is required to keep the light intensity of an optical transmission signal constant, and, by the wavelength multiplexing optical transmission method, it is also necessary to keep the light intensity of each wavelength channel constant. Therefore, part of the optical transmission signal is split to monitor the light intensity, and the light source is controlled so that the light intensity to be monitored becomes constant.

Figure 1:
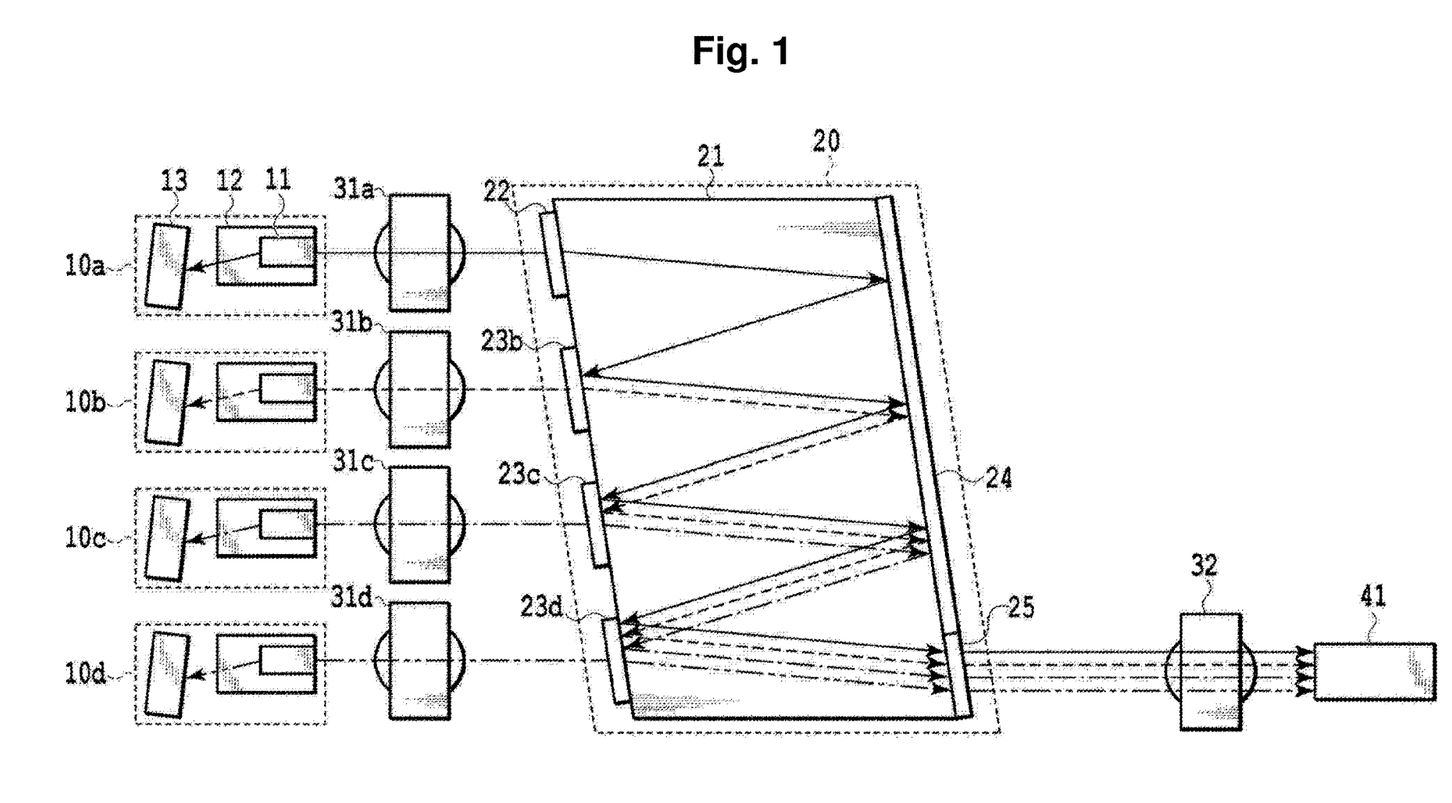
FIG. 1 is a diagram illustrating an example of a conventional multi-wavelength channel optical transmitter.

FIG. 1 illustrates an example of a multi-wavelength channel optical transmitter that is a conventional multi-wavelength channel optical transmitter, and multiplexes four wavelengths. Output light beams from light sources 10a to 10d for the respective wavelength channels are input to an optical multiplexer 20 via collimator lenses 31a to 31d, and are multiplexed. Outputs of the optical multiplexer in all wavelength channels are multiplexed as wavelength multiplexed light via a condenser lens 32, and the wavelength multiplexed light is coupled to an optical fiber 41.

Figure 2:
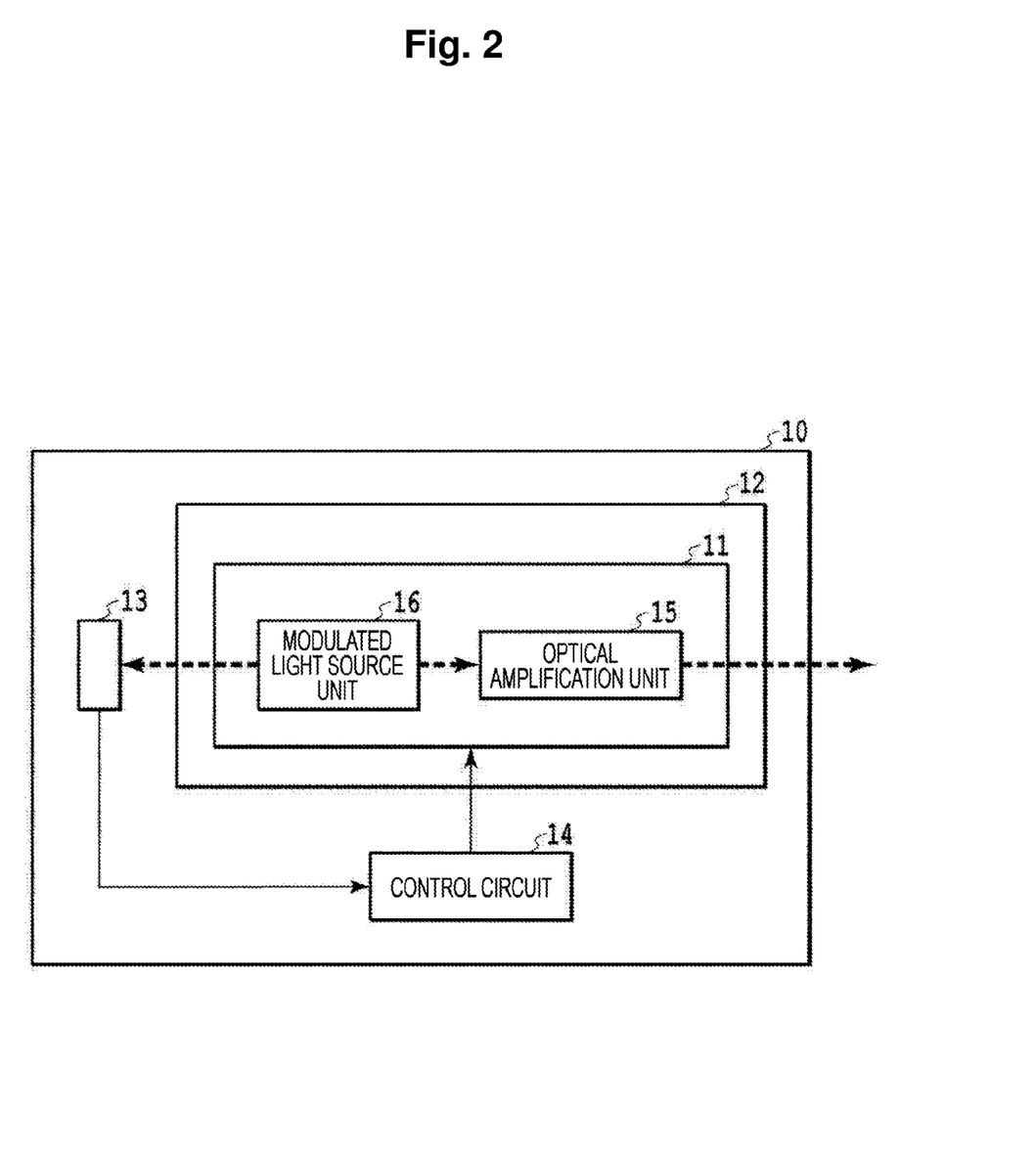
FIG. 2 is a diagram illustrating an example of a light source of the conventional multi-wavelength channel optical transmitter.

FIG. 2 illustrates an example of a light source. In a light source 10, a light source chip 11 including a modulated light source unit 16 and an optical amplification unit 15 is mounted on a subcarrier 12, and a monitor PD 13 that monitors part of the output light beam from the modulated light source unit 16 is mounted on the rear end of the light source chip 11. The monitor PD 13 detects the optical output power of each wavelength channel as a current value, and a control circuit 14 adjusts the amount of current supply to the light source chip 11 so that the detected current value becomes constant. By such an optical output control (APC) circuit, the optical output power from each light source chip 11 can be made constant at all times (see Non Patent Literature 2, for example).

The optical multiplexer 20 includes a glass block 21, and an antireflective film 22 that transmits an output light beam from the first light source 10a is formed on the end surface on the light source side. A reflecting mirror 24 is formed on the end surface on the output side of the glass block 21, and reflects the output light beam from the first light source 10a toward the light source side. Wavelength filters 23b to 23d that transmit output light beams from the second light sources 10b to 10d and reflect light reflected by the reflecting mirror 24 are formed on the end surface on the light source side. The optical signals of the respective wavelength channels reciprocate between the reflecting mirror 24 and the wavelength filters 23b to 23d, are sequentially multiplexed, pass through an antireflective film 25 formed on the end surface on the output side, and are output as wavelength multiplexed light.

As described above, the configuration in which the monitor PDs 13 are disposed at the rear ends of the light source chips 11 can monitor the optical output power proportional to the output light beams from the light source chips 11. However, the optical output power of each wavelength channel when output as wavelength multiplexed light cannot be accurately monitored.

Figure 3:
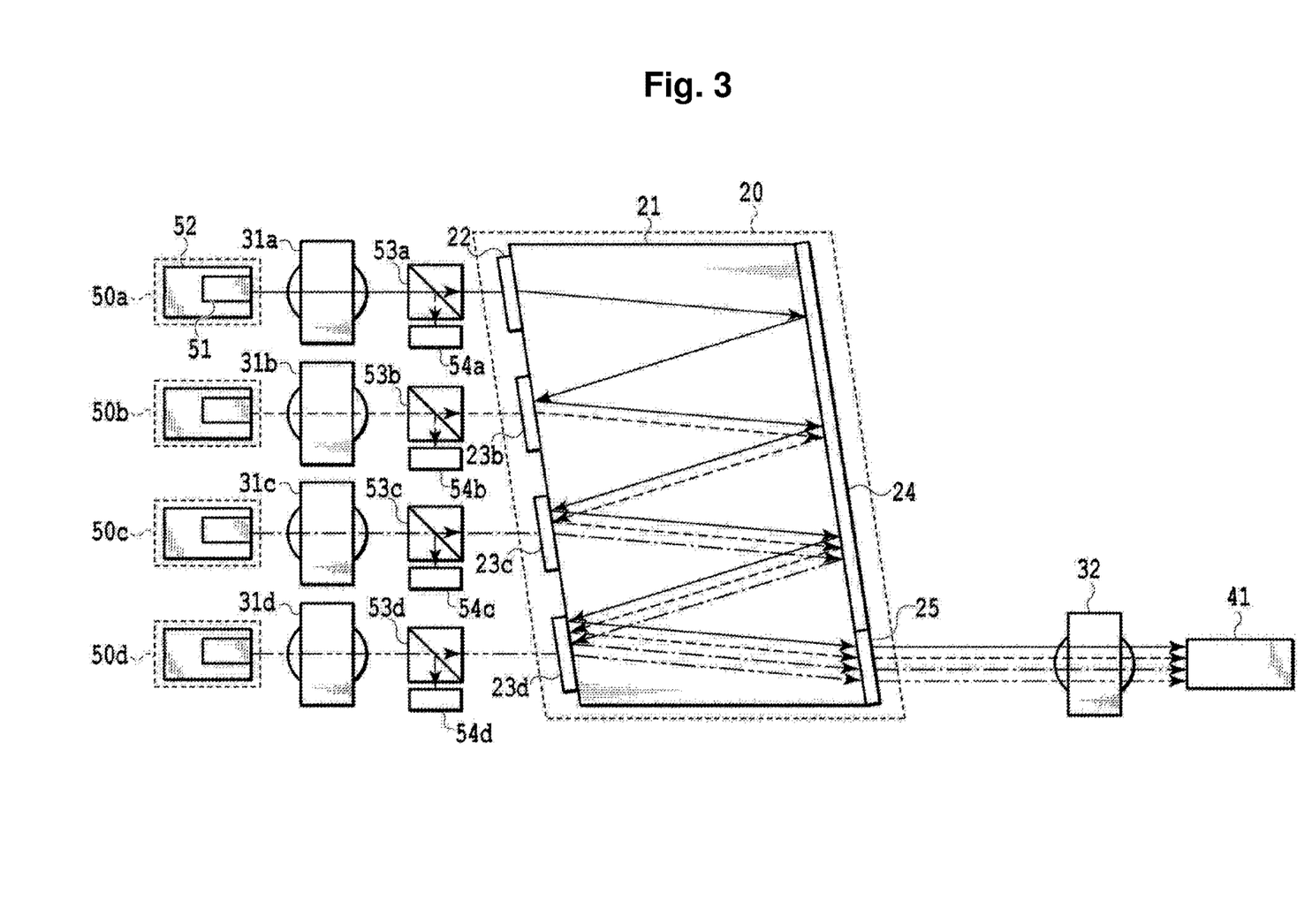
FIG. 3 is a diagram illustrating another example of a conventional multi-wavelength channel optical transmitter.

FIG. 3 illustrates another example of a conventional multi-wavelength channel optical transmitter. Output light beams from light sources 50a to 50d for the respective wavelength channels are input to an optical multiplexer 20 via collimator lenses 31a to 31d and beam splitters 53a to 53d, and are multiplexed. Outputs of the optical multiplexer 20 in all wavelength channels are multiplexed as wavelength multiplexed light via a condenser lens 32, and the wavelength multiplexed light is coupled to an optical fiber 41 (see Non Patent Literature 1, for example).

Output light beams from light source chips 51 are partially split by the beam splitters 53a to 53d, and are monitored by monitor PDs 54a to 54d. Outputs of the monitor PDs 54a to 54d are input to a control circuit for the light sources 50, and the amounts of current supply to the light source chips 51 are adjusted so that the detected current value becomes constant.

As described above, in the configuration in which the monitor PDs 54 are disposed on the output sides of the light source chips 51, optical outputs from the optical amplification units of the light sources 50 can be accurately monitored, but a light loss equivalent to the passage loss and the branch loss at the beam splitters 53 is generated. Further, the length of the optical path for the output light beam from the first light source 50a to pass through the optical multiplexer 20 is longer than the lengths of the optical paths of the other wavelength channels, and therefore, the loss of the output light beam from the first light source 50a is large.

There also is a method for monitoring the optical output power of each wavelength channel by applying a wavelength filter in place of the reflecting mirror, as in an optical module disclosed in Patent Literature 1. However, preparing individual wavelength filters for the respective wavelength channels leads to increases in cost, such as an increase in the number of components of the optical multiplexer, and an increase in the number of manufacturing steps.

Further, in a conventional light source chip 11, the spread of the beam of an output light beam is wide, and the emitted beam may reach the outside of the spherical shape having the effective diameter of the collimator lens 31. The beam that has reached the outside does not turn into collimated light, but turns into a loss and is scattered inside the multi-wavelength channel optical transmitter. As a result, light reaches an unexpected area.

CITATION LIST

Patent Literature

Patent Literature 1: JP 2017-98505 A

Non Patent Literature

Non Patent Literature 1: K. Tsuzuki et. al., "Full C-Band Tunable DFB Laser Array Copackaged With InP Mach-Zehnder Modulator for DWDM Optical Communication Systems," Journal of selected topics in quantum electronics, vol. 15, no. 3, pp. 521-527, 2009

Non Patent Literature 2: L. B. Aronson et. al., "Transmitter Optical Subassembly for XFP Applications," ECTC2005, DOI:10.1109ECTC.2005.1441402

SUMMARY OF INVENTION

An embodiment of the present invention is an optical transmitter that multiplexes and outputs a plurality of wavelength channels, and includes: a first light source; at least one second light source having a different wavelength from the first light source, the at least one second light source each having a different wavelength; a plurality of collimator lenses coupled to respective outputs of the first light source and the second light source; an optical multiplexer that causes an output light beam from the first light source to be transmitted from a first end surface to a second end surface facing the first end surface, causes the output light beam from the first light source to be reflected by a reflecting mirror formed on the second end surface, causes an output light beam from the second light source to pass through a wavelength filter formed on the first end surface, causes the output light beam from the second light source to be reflected by the reflecting mirror, and causes output light beams of the respective wavelength channels to reciprocate between the reflecting mirror and the wavelength filter, to sequentially multiplex the output light beams of the respective wavelength channels; a plurality of beam splitters respectively inserted between the plurality of collimator lenses and the first end surface, the beam splitters each having an antireflective film formed in a region corresponding to the maximum diameter of a parallel light beam collimated by the collimator lens; and a plurality of monitor PDs that monitor optical powers branched from the respective beam splitters of the plurality of beam splitters.

With this configuration, it is possible to accurately monitor optical outputs from light sources, using light that has neither a passage loss nor a branch loss due to a beam splitter during outputting from the light sources to an optical multiplexer, and does not pass through an antireflective film.

DESCRIPTION OF EMBODIMENTS

The following is a detailed description of embodiments of the present invention, with reference to the drawings.

Example 1

Figure 4:
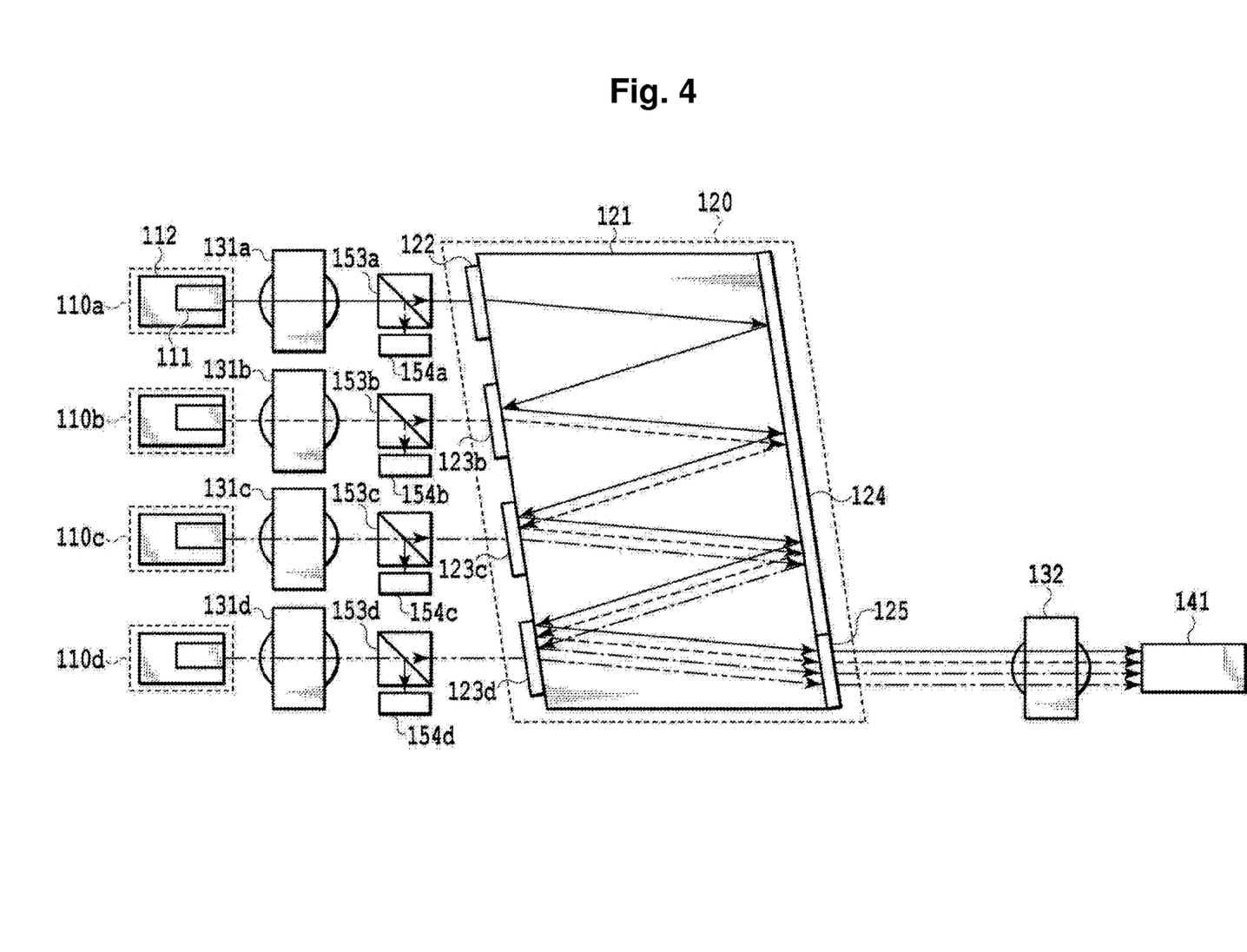
FIG. 4 is a diagram illustrating a multi-wavelength channel optical transmitter according to Example 1 of the present invention.

FIG. 4 illustrates an example of a multi-wavelength channel optical transmitter that is a multi-wavelength channel optical transmitter according to Example 1 of the present invention, and multiplexes four different wavelengths. Output light beams from light sources 110a to 110d for the respective wavelength channels are input to an optical multiplexer 120 via collimator lenses 131a to 131d and beam splitters 153a to 153d, and are multiplexed. Outputs of the optical multiplexer 120 in all wavelength channels are multiplexed as wavelength multiplexed light via a condenser lens 132, and the wavelength multiplexed light is coupled to an optical fiber 141.

The optical multiplexer 120 includes a glass block 121, and an antireflective film 122 that transmits an output light beam from the first light source 110a is formed on the end surface on the light source side. A reflecting mirror 124 is formed on the end surface on the output side of the glass block 121, and reflects the output light beam from the first light source 110a toward the light source side. Wavelength filters 123b to 123d that transmit output light beams from the second light sources 110b to 110d and reflect light reflected by the reflecting mirror 124 are formed on the end surface on the light source side. The optical signals of the respective wavelength channels reciprocate between the reflecting mirror 124 and the wavelength filters 123b to 123d, are sequentially multiplexed, pass through an antireflective film 125 formed on the end surface on the output side, and are output as wavelength multiplexed light.

The output light beams from the first light source 110a and the second light sources 110b to 110d are partially split by the beam splitters 153a to 153d, and the optical powers of the respective output light beams are monitored by the monitor PDs 154a to 154d. Outputs of the monitor PDs 154a to 154d are input to a control circuit for the light sources 150, and the amounts of current supply to light source chips 151 are adjusted so that the detected current values become constant, or the optical power of each output light beam becomes constant.

Figure 5:
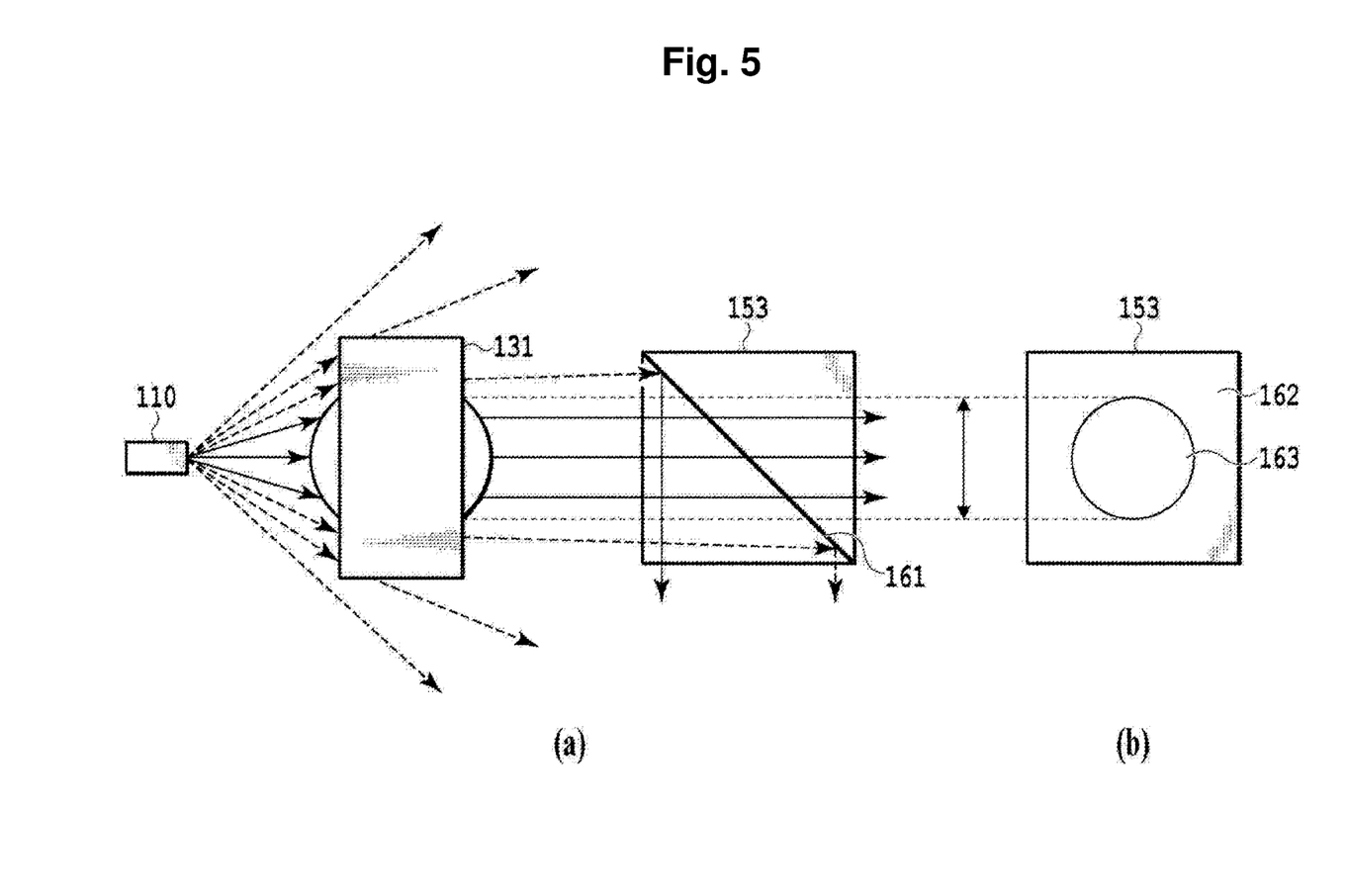
FIG. 5 is a diagram illustrating the structure of a beam splitter of the multi-wavelength channel optical transmitter of Example 1.

FIG. 5 illustrates the structure of a beam splitter of the multi-wavelength channel optical transmitter of Example 1. FIG. 5(a) is a view from a direction that is perpendicular to the optical axis of the output light beam from a light source 110, and is horizontal to an optical thin film surface 161 of a cube-shaped beam splitter 153. The output light beam output from the light source 110 is condensed by a collimator lens 131. At this point of time, the beam (indicated by a solid lines in FIG. 5) entering the lens spherical surface turns into collimated light, but the beam (indicated by dotted lines in FIG. 5) entering the area outside the lens spherical surface does not turn into collimated light and spreads without being condensed even after being output from the collimator lens 131. Part of the beam that has entered the outside enters the beam splitter 153, but is transmitted without being condensed. Some other part of the beam is further split and is input to a monitor PD 154. The remaining part of the beam that has entered the outside is scattered inside the multi-wavelength channel optical transmitter. Therefore, the beam that has entered the outside turns into light not to be coupled to the optical fiber 141.

FIG. 5(b) is a view of the optical thin film surface 161 of the beam splitter 153 viewed from the side of the light source 110 in the optical axis direction of the output light. The optical thin film surface 161 is coated with an antireflective film only in a region 163 corresponding to the maximum diameter of a collimated parallel light beam unique to the lens shape, which contributes to fiber coupling. The peripheral region 162 other than the region 163 is uncoated, or is coated with a reflective film.

With such a configuration, the beam (indicated by solid lines in FIG. 5) collimated by the lens spherical surface of the collimator lens 131 passes through the region 163 and reaches the optical multiplexer 120. Therefore, there is neither a passage loss nor a branch loss due to beam splitters as in the conventional multi-wavelength channel optical transmitter illustrated in FIG. 1, and the optical outputs from the optical amplification units of the light sources 110 can be output to the optical multiplexer 120. Also, all the beam (indicated by the dotted lines in FIG. 5) that has entered the area outside the lens spherical surface is reflected by the region 163 of the optical thin film surface 161, and is input to the monitor PD 154. Thus, it is possible to accurately monitor the optical output from the light source 110, using the light not to be coupled to the optical fiber 141.

The antireflective film 122 integrated into the optical multiplexer 120, and the antireflective films on the optical thin film surfaces 161 of the beam splitters 153 have a transmittance of 99%. The beam splitters 53 of the conventional optical transmitter illustrated in FIG. 3 have a reflectance of 2% and a transmittance of 98%. Meanwhile, the glass block 121 has a light loss of 1% in propagation between the antireflective film 122/the wavelength filters 123, and the reflecting mirror 124. The efficiency of lens coupling of the output of the optical multiplexer 120 to the optical fiber 141 is 63%.

After the multi-wavelength channel optical transmitter of Example 1 was assembled excluding the beam splitters 153 and the monitor PDs 154, the output of the light source chip 111 of each wavelength channel was set to +4 dBm, and the optical output to be coupled to the optical fiber 141 was measured. The optical outputs of the light sources 110a to 110d of the wavelength channels 1 to 4 were +1.25, +1.43, +1.64, and +1.87 dBm, respectively.

Next, the beam splitters 153 each having the region 163 coated with a reflective film, and the monitor PDs 154 were mounted on the optical transmitter. The power of the light branched to the side of the monitor PDs 154 was −8 dBm. This is the power of the light at the time when the beams that entered the areas outside the lens spherical surfaces of the collimator lenses 131 were reflected by the reflective films in the regions 163. At this point of time, the optical outputs of the wavelength channels 1 to 4 were +1.21, +1.39, +1.60, and +1.82 dBm, respectively.

For comparison, in the conventional multi-wavelength channel optical transmitter illustrated in FIG. 3, the optical outputs of the light sources 10a to 10d of the wavelength channels 1 to 4 were +1.07, +1.25, +1.47, and +1.69 dBm, respectively. At this point of time, the power of the light branched to the side of the monitor PDs 54 was −11 dBm.

As can be seen from the above results, the loss of output light beam in each wavelength channel was lower than that in the conventional structure, and the optical output reaching the monitor PD side was large. This fact indicates that the structure of Example 1 is beneficial in improving the optical output power to be coupled to an optical fiber. Furthermore, since the optical power reaching the monitor PD side is larger in the structure of Example 1 than in the conventional structure, it has been confirmed that part of the component to turn into scattered light is received by the monitor PDs, and this is effective in reducing scattered light.

Example 2

Figure 6:
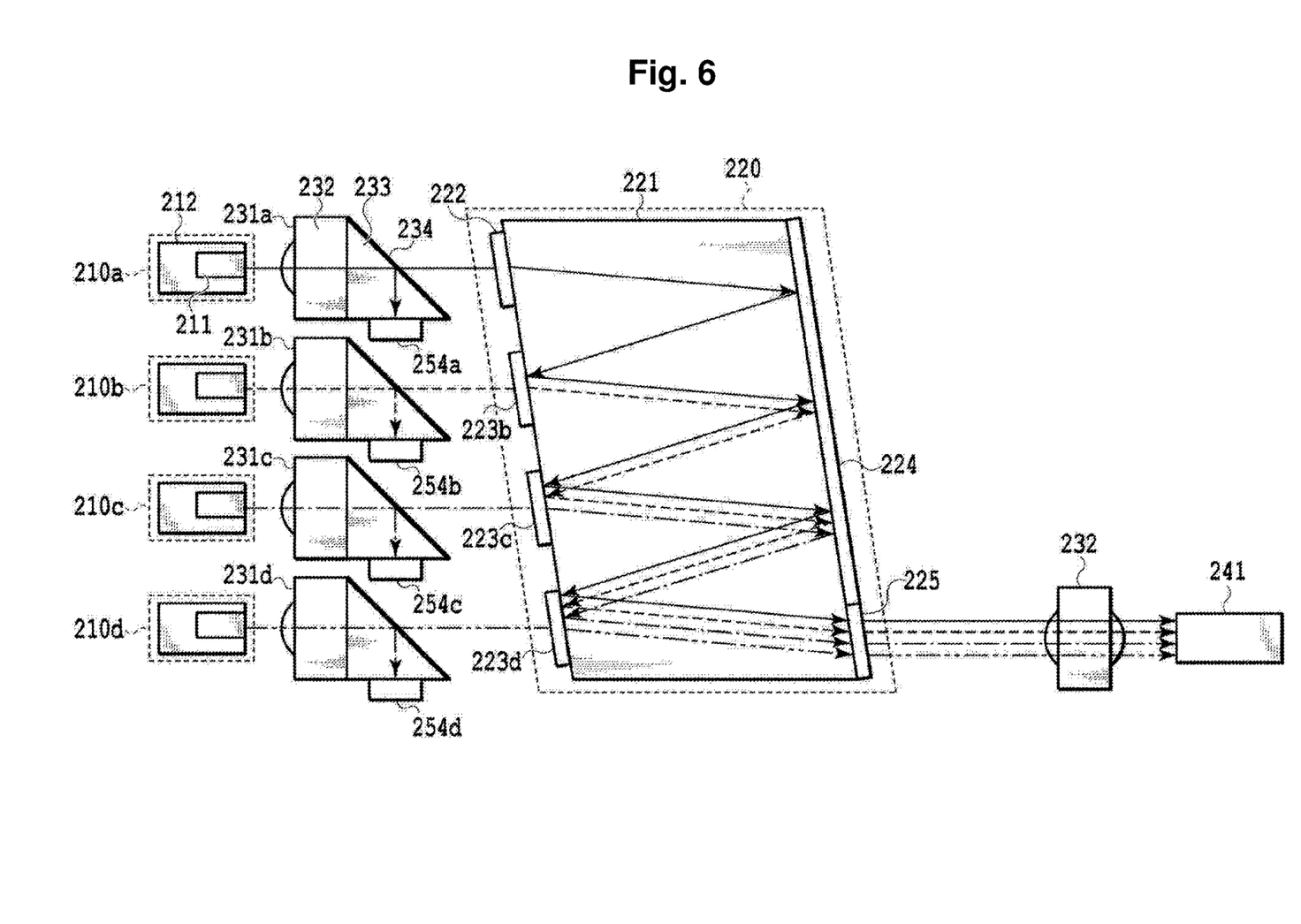
FIG. 6 is a diagram illustrating a multi-wavelength channel optical transmitter according to Example 2 of the present invention.

FIG. 6 illustrates an example of a multi-wavelength channel optical transmitter that is a multi-wavelength channel optical transmitter according to Example 2 of the present invention, and multiplexes four different wavelengths. Output light beams from light sources 210a to 210d for the respective wavelength channels are input to an optical multiplexer 220 via optical blocks 231a to 231d having collimator lenses and beam splitters integrated therein, and are multiplexed. Outputs of the optical multiplexer 220 in all wavelength channels are multiplexed as wavelength multiplexed light via a condenser lens 232, and the wavelength multiplexed light is coupled to an optical fiber 241.

The optical multiplexer 220 includes a glass block 221, and an antireflective film 222 that transmits the output light beam from the first light source 210a is formed on the end surface on the light source side. A reflecting mirror 224 is formed on the end surface on the output side of the glass block 221, and reflects the output light beam from the first light source 210a toward the light source side. Wavelength filters 223b to 223d that transmit output light beams from the second light sources 210b to 210d and reflect light reflected by the reflecting mirror 224 are formed on the end surface on the light source side. The optical signals of the respective wavelength channels reciprocate between the reflecting mirror 224 and the wavelength filters 223b to 223d, are sequentially multiplexed, pass through an antireflective film 225 formed on the end surface on the output side, and are output as wavelength multiplexed light.

In an optical block 231, a collimator lens 232, and a beam splitter 233 having an optical thin film surface 234 are joined. The optical thin film surface 234 is the same as the optical thin film surface 161 shown in FIG. 5(b) of Example 1, and is coated with an antireflective film in a region equivalent to the maximum collimated beam diameter unique to the lens shape. The remaining peripheral region is uncoated or is coated with a reflective film.

The output light beams from the first light source 210a and the second light sources 210b to 210d are partially split by the beam splitters 233, and the optical powers of the respective output light beams are monitored by monitor PDs 254. Outputs of the monitor PDs 254 are input to a control circuit for the light sources 210, and the amounts of current supply to light source chips 211 are adjusted so that the detected current values become constant, or the optical power of each output light beam becomes constant.

The antireflective film 222 integrated into the optical multiplexer 220, and the antireflective films on the optical thin film surfaces 234 of the beam splitters 233 have a transmittance of 99%. The beam splitters 53 of the conventional optical transmitter illustrated in FIG. 3 have a reflectance of 2% and a transmittance of 98%. Meanwhile, the glass block 221 has a light loss of 1% in propagation between the antireflective film 222/the wavelength filters 223b to 223d, and the reflecting mirror 224. The efficiency of lens coupling of the output of the optical multiplexer 220 to the optical fiber 241 is 63%.

After the optical transmitter was assembled as a multi-wavelength channel optical transmitter, the output of the light source chip 211 of each wavelength channel was set to +5 dBm, and the optical output to be coupled to the optical fiber 241 was measured. In Example 2, the optical outputs of the light sources 210a to 210d in the wavelength channels 1 to 4 were +2.21, +2.39, +2.61, and +2.82 dBm, respectively. Further, the power of the light branched to the side of the monitor PDs 254 was −7.5 dBm. In the conventional optical transmitter illustrated in FIG. 3, the power of the light branched to the side of the monitor PDs 54 was −13 dBm.

As can be seen from the above results, the loss of output light beam in each wavelength channel was lower than that in the conventional structure, and the optical output reaching the monitor PD side was large. This fact indicates that the structure of Example 2 is beneficial in improving the optical output power to be coupled to an optical fiber. Furthermore, since the optical power reaching the monitor PD side is larger in the structure of Example 2 than in the conventional structure, it has been confirmed that part of the component to turn into scattered light is received by the monitor PDs, and this is effective in reducing scattered light.

Example 3

Figure 7:
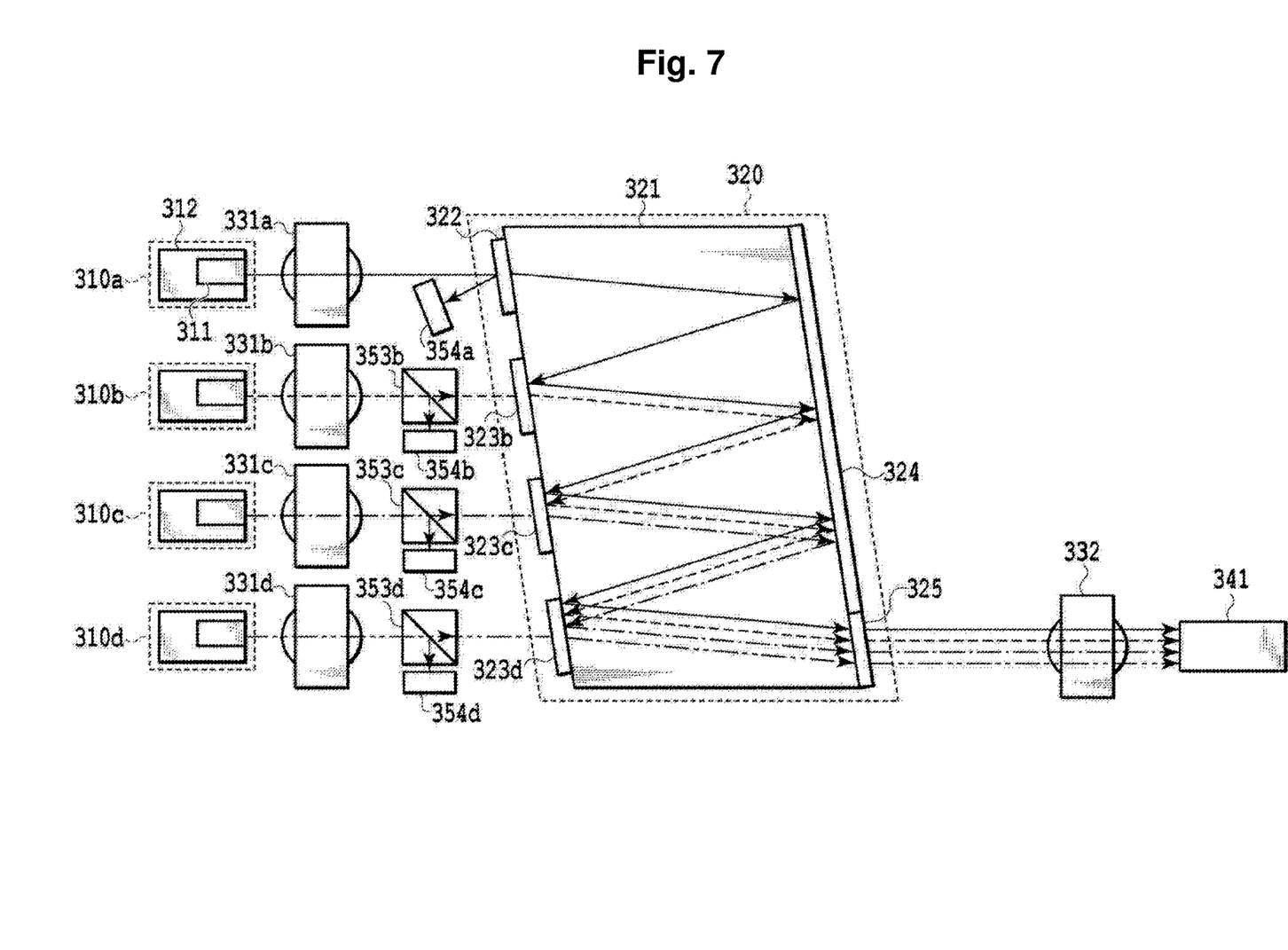
FIG. 7 is a diagram illustrating a multi-wavelength channel optical transmitter according to Example 3 of the present invention.

FIG. 7 illustrates an example of a multi-wavelength channel optical transmitter that is a multi-wavelength channel optical transmitter according to Example 3 of the present invention, and multiplexes four different wavelengths. Output light beams from light sources 310a to 310d for the respective wavelength channels are input to an optical multiplexer 320 via collimator lenses 331a to 331d, and are multiplexed. Outputs of the optical multiplexer 320 in all wavelength channels are multiplexed as wavelength multiplexed light via a condenser lens 332, and the wavelength multiplexed light is coupled to an optical fiber 341.

The optical multiplexer 320 includes a glass block 321, and a circular antireflective film 322 that transmits the output light beam from the first light source 310a and splits part of the output light beam to a monitor PD 354a is formed on the end surface on the light source side. The circular antireflective film 322 has a configuration similar to that of the optical thin film surface 161 shown in FIG. 5(b) of Example 1, and is coated with an antireflective film in a region equivalent to the maximum collimated beam diameter unique to the lens shape. The remaining peripheral region is uncoated or is coated with a reflective film. Of the output light beam from the first light source 310a, the beam collimated by the lens spherical surface of the collimator lens 331 passes through the antireflective film, and enters the glass block 321. The beam that has entered the peripheral region is input as reflected light from the optical multiplexer 320 to the monitor PD 354a, and the optical power of the output light beam from the first light source 310a is monitored. A reflecting mirror 324 is formed on the end surface on the output side of the glass block 321, and reflects the output light beam from the first light source 310a toward the light source side.

The output light beams from the second light sources 310b to 310d are partially split by beam splitters 353b to 353d, and the optical powers of the respective output light beams are monitored by monitor PDs 354b to 354d. The optical thin film surface of a beam splitter 353 is the same as the optical thin film surface 161 shown in FIG. 5(b) of Example 1, and is coated with an antireflective film in a region equivalent to the maximum collimated beam diameter unique to the lens shape. The remaining peripheral region is uncoated or is coated with a reflective film. Wavelength filters 323b to 323d that transmit output light beams from the second light sources 310b to 310d and reflect light reflected by the reflecting mirror 324 are formed on the end surface on the light source side. The optical signals of the respective wavelength channels reciprocate between the reflecting mirror 324 and the wavelength filters 323b to 323d, are sequentially multiplexed, pass through an antireflective film 325 formed on the end surface on the output side, and are output as wavelength multiplexed light.

Outputs of the monitor PDs 354a to 354d are input to a control circuit for the light sources 310, and the amounts of current supply to light source chips 311 are adjusted so that the detected current values become constant, or the optical power of each output light beam becomes constant.

In the conventional optical transmitter illustrated in FIG. 3, the output light beam from the first light source passes through the beam splitter 53a and the antireflective film 22 of the optical multiplexer 20, and propagates in the glass block 21. In the optical transmitter of Example 3, on the other hand, the output light beam from the first light source passes only through the circular antireflective film 322 of the optical multiplexer 320, and propagates in the glass block 321. The antireflective film is a unidirectional transmissive film, and can reduce reflection at the end surface of the glass block, but a small reflected component is generated on the incident surface of the antireflective film. Accordingly, with the optical transmitter of Example 3, it is possible to eliminate the light loss equivalent to this reflected component. The length of the optical path for the output light beam from the first light source 310a to pass through the optical multiplexer 320 is longer than the lengths of the optical paths of the other wavelength channel. Therefore, the loss is large, but the light loss equivalent to the reflected component can be eliminated.

The circular antireflective film 322 of the optical multiplexer 320, and the antireflective films on the optical thin film surfaces of the beam splitters 353 have a transmittance of 99%. The beam splitters 53 of the conventional optical transmitter illustrated in FIG. 3 have a reflectance of 2% and a transmittance of 98%. Meanwhile, the glass block 321 has a light loss of 1% in propagation between the antireflective film 322/the wavelength filters 323b to 323d, and the reflecting mirror 324. The efficiency of lens coupling of the output of the optical multiplexer 320 to the optical fiber 341 is 63%.

After the optical transmitter was assembled as a multi-wavelength channel optical transmitter, the output of the light source chip 311 of each wavelength channel was set to +4 dBm, and the optical output to be coupled to the optical fiber 341 was measured. The optical output of the light source 310 of wavelength channel 1 was +1.19 dBm. Further, the power of the light branched to the side of the monitor PD 354a was measured, and was −10.8 dBm. In the conventional optical transmitter illustrated in FIG. 3, when the output of the light source chip 50a was +4 dBm, the optical output power of the wavelength channel 1 was +1.07 dBm. Further, the power of the light branched to the side of the monitor PD 54 was −11 dBm.

As can be seen from the above results, the loss of output light beam in each wavelength channel was lower than that in the conventional structure, and the optical output reaching the monitor PD side was large. This fact indicates that the structure of Example 2 is beneficial in improving the optical output power to be coupled to an optical fiber. Furthermore, since the optical power reaching the monitor PD side is larger in the structure of Example 2 than in the conventional structure, it has been confirmed that part of the component to turn into scattered light is received by the monitor PDs, and this is effective in reducing scattered light.

In Example 3 described above, a multi-wavelength channel optical transmitter multiplexes four wavelengths, the first light source is of the wavelength channel having the longest optical path length for passing light through the optical multiplexer, and the three second light sources are of the other wavelength channels. Example 3 can be applied to any configurations in which the number of second light source is one or larger.

The invention claimed is:

1. An optical transmitter that multiplexes and outputs a plurality of wavelength channels, the optical transmitter comprising:
   a first light source;
   at least one second light source having a different wavelength from the first light source, the at least one second light source each having a different wavelength;
   a plurality of collimator lenses coupled to respective outputs of the first light source and the second light source;
   an optical multiplexer that causes an output light beam from the first light source to be transmitted from a first end surface to a second end surface facing the first end surface, causes the output light beam from the first light source to be reflected by a reflecting mirror formed on the second end surface, causes an output light beam from the second light source to pass through a wavelength filter formed on the first end surface, causes the output light beam from the second light source to be reflected by the reflecting mirror, and causes output light beams of the respective wavelength channels to reciprocate between the reflecting mirror and the wavelength filter, to sequentially multiplex the output light beams of the respective wavelength channels;
   a plurality of beam splitters respectively inserted between the plurality of collimator lenses and the first end surface, the beam splitters each having an antireflective film formed in a region corresponding to a maximum diameter of a parallel light beam collimated by the collimator lens, and a reflective film being formed on the same surface as the antireflective film, in a peripheral region, other than the region corresponding to the maximum diameter of the parallel light beam; and
   a plurality of monitor PDs that monitor optical powers branched from the respective beam splitters of the plurality of beam splitters.

2. The optical transmitter according to claim 1, wherein the collimator lens and the beam splitter are integrated.

3. An optical transmitter that multiplexes and outputs a plurality of wavelength channels, the optical transmitter comprising:
   a first light source;
   at least one second light source having a different wavelength from the first light source, the at least one second light source each having a different wavelength;
   a plurality of collimator lenses coupled to respective outputs of the first light source and the second light source;
   an optical multiplexer that causes an output light beam from the first light source to be transmitted from a first end surface to a second end surface facing the first end surface, causes the output light beam from the first light source to be reflected by a reflecting mirror formed on the second end surface, causes an output light beam from the second light source to pass through a wavelength filter formed on the first end surface, causes the output light beam from the second light source to be reflected by the reflecting mirror, and causes output light beams of the respective wavelength channels to reciprocate between the reflecting mirror and the wavelength filter, to sequentially multiplex the output light beams of the respective wavelength channels;
   a first monitor PD that monitors an optical power, using part of the output light beam from the first light source as reflected light from the optical multiplexer;
   at least one beam splitter inserted between at least one collimator lens coupled to respective outputs of the at least one second light source and the first end surface, the beam splitter having an antireflective film formed in a region corresponding to a maximum diameter of a parallel light beam collimated by the collimator lens; and
   at least one second monitor PD that monitors optical powers branched from the respective beam splitters of the at least one beam splitter,
   wherein the optical multiplexer includes a circular anti-reflective film that is formed on the first end surface, transmits a beam collimated by the collimator lens in the output light beam from the first light source, and splits part of the output light beam from the first light source to the first monitor PD,
   the circular anti-reflection film is formed in a region corresponding to the maximum diameter of the parallel light beam collimated by the collimator lens, and a reflective film is formed in the surrounding area of the first end face other than the area corresponding to the maximum diameter.

* * * * *